United States Patent
Prasad et al.

(10) Patent No.: US 12,012,006 B2
(45) Date of Patent: Jun. 18, 2024

(54) CIRCUIT-TRIGGERED FAULT MITIGATION FOR BATTERY ELECTRIC SYSTEM AND MOTOR VEHICLE HAVING THE SAME

(71) Applicant: GM GLOBAL TECHNOLOGY OPERATIONS LLC, Detroit, MI (US)

(72) Inventors: Rashmi Prasad, Troy, MI (US); Robert J. Heydel, Clawson, MI (US); Andrew K. Chandler, Plymouth, MI (US); Shubham V. Shedge, Northville, MI (US); Chandra S. Namuduri, Troy, MI (US); Eleni C. Pitses, Grosse Pointe Park, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 190 days.

(21) Appl. No.: 17/692,480

(22) Filed: Mar. 11, 2022

(65) Prior Publication Data

US 2023/0286388 A1    Sep. 14, 2023

(51) Int. Cl.
| | |
|---|---|
| *H02H 9/08* | (2006.01) |
| *B60L 3/00* | (2019.01) |
| *B60L 3/04* | (2006.01) |
| *B60L 58/14* | (2019.01) |
| *B60L 58/15* | (2019.01) |
| *H01H 39/00* | (2006.01) |
| *H02P 23/26* | (2016.01) |
| *H02P 27/14* | (2006.01) |

(52) U.S. Cl.
CPC ............... *B60L 3/04* (2013.01); *B60L 3/0046* (2013.01); *B60L 58/14* (2019.02); *B60L 58/15* (2019.02); *H01H 39/006* (2013.01)

(58) Field of Classification Search
CPC .................................... H02P 9/04; H02H 3/14
See application file for complete search history.

(56) References Cited

U.S. PATENT DOCUMENTS

| | | |
|---|---|---|
| 10,940,771 B1 | 3/2021 | Fatemi et al. |
| 2021/0078429 A1 | 3/2021 | Li et al. |
| 2021/0078442 A1 | 3/2021 | Prasad et al. |
| 2021/0091575 A1 | 3/2021 | Li et al. |
| 2021/0257843 A1 | 8/2021 | Mituta et al. |
| 2022/0148832 A1* | 5/2022 | Kube .................. B60R 16/0232 |
| 2022/0340020 A1* | 10/2022 | Papadopoulos ...... B60K 7/0007 |

* cited by examiner

*Primary Examiner* — Eduardo Colon Santana
*Assistant Examiner* — Charles S Laughlin
(74) *Attorney, Agent, or Firm* — Quinn IP Law

(57) ABSTRACT

A battery electric system for a motor vehicle or another electrified system includes a battery pack connected to a direct current voltage bus, and having positive and negative battery terminals, a main pyrotechnic fuse ("pyro fuse"), a high-voltage (HV) component connected to the bus via an HV channel, a current sensing element connected to the HV component on the HV channel, and a control system configured to selectively disconnect the battery pack from the bus by transmitting a voltage signal to the main pyro fuse when a measured current value from the current sensor is indicative of a short-circuit fault. A channel switch may be connected to or integral with the current sensing element, and configured to disconnect the HV component from the bus by opening in response to the measured current value.

20 Claims, 8 Drawing Sheets

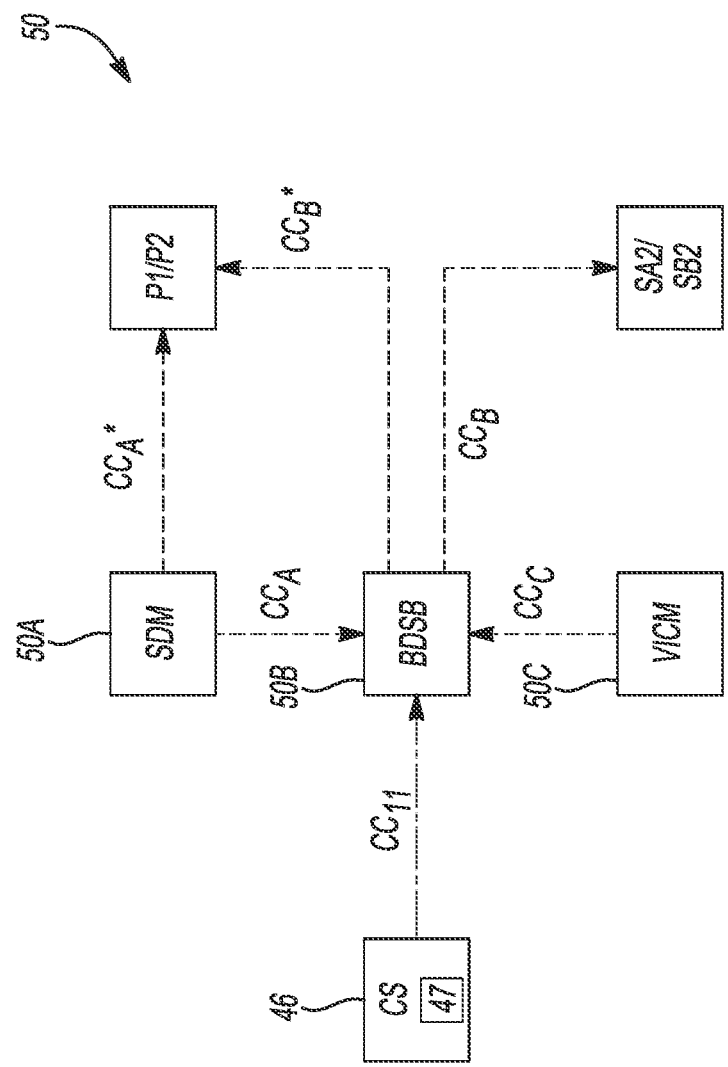

CIRCUIT-TRIGGERED FAULT MITIGATION FOR BATTERY ELECTRIC SYSTEM AND MOTOR VEHICLE HAVING THE SAME

INTRODUCTION

The present disclosure relates to high-voltage (HV) battery electric systems having a rechargeable electrochemical battery pack and one or more HV components connected thereto. When the battery electric system is used as part of an electrified powertrain, e.g., of a battery electric vehicle (BEV), plug-in hybrid electric vehicle, or other mobile system, the battery pack is an integral component of a rechargeable energy storage system (RESS). The RESS in turn is connected in such systems to one or more electric propulsion motors. When the electric propulsion motors are configured as polyphase/alternating current (AC) motors, the HV components arranged in respective HV circuit legs or channels may include a corresponding power inverter, referred to in the art and hereinbelow as a power inverter module (PIM). Other HV components powered by the RESS may include auxiliary power modules (APMs) in the form of direct current (DC)-to-DC voltage converters, onboard charging modules (OBCMs), air conditioning compressor modules (ACCMs), etc., which are connected to the RESS and its battery pack(s) across opposing voltage bus rails of a DC voltage bus.

High-power vehicular applications traditionally employ a single battery pack having an application-suitable number of electrochemical battery cells. The constituent battery cells collectively provide a required battery voltage to the connected HV components. In contrast, emerging reconfigurable batteries selectively interconnect multiple battery packs in series ("S-connected") or parallel ("P-connected") configurations. Reconfigurable batteries of this type are able to selectively employ the S-connected configuration during battery charging operations using an offboard charging station, which may be capable of providing DC charging voltages well above levels typically used to power vehicle propulsion functions.

SUMMARY

A battery electric system as described herein includes one or more battery packs, with the battery electric system being operable for disconnecting the battery pack and/or connected HV components in a fault-dependent manner. Additional battery packs or just one battery pack may be used in different embodiments within the scope of the present disclosure. In a two-pack representative construction as illustrated herein, the battery packs are selectively interconnectable in series ("S-connected") or parallel ("P-connected") using a battery switching circuit.

Additionally, the battery electric system includes a battery disconnect circuit equipped with one or more current sensing elements. Output signals from the current sensing elements are used herein to provide the subject battery electric system with short-circuit fault disconnect functionality, such that disconnection is triggered in a circuit-based/actively controlled manner, contrary to passive thermal fuse activation. Although short-circuit fault-based disconnection functions are a primary focus of the disclosed battery disconnect circuit, the present teachings also provide emergency/post-accident and overcurrent fault-based disconnection of the battery pack(s) using the provided circuit hardware. The various solutions described below are collectively able to use sensor output-based triggering of various irreversible switching devices, including the describe pyrotechnic switches or fuses ("pyro fuses", collectively), or solid-state relays/electronic fuses/e-Fuses that can provide a reset function.

The control system is exemplified herein for illustrative clarity as having multiple electronic control units, including a Sensing and Diagnostics Module (SDM), a Bus Disconnect Signal Board (BDSB), and a Vehicle Integration Control Module (VICM). Each control unit performs a corresponding function in the course of providing the described disconnect functions and protection, as set forth in greater detail below.

In particular, the disconnect strategy of the present disclosure is intended to protect the RESS and connected HV components from thermal damage after various potential vehicle faults, including short-circuit faults, accidents or other threshold force/deceleration-based faults events, and overcurrent faults. In the various described embodiments, thermal fuses of the types normally disposed between the battery pack(s) and connected HV components are replaced with one or more current sensing elements. Electronic signals from the current sensing elements directly or indirectly trigger disconnection via one or more main pyrotechnic fuses ("main pyro fuses") or HV channel-specific switches ("channel switches").

In accordance with an exemplary embodiment, the battery electric system includes a direct current (DC) voltage bus having positive and negative bus rails, and a battery pack connected to the DC voltage bus and having positive and negative battery terminals. An HV component is connected to the DC voltage bus via an HV channel, while a current sensing element is connected to the HV component on the HV channel and configured to output a measured current value. In this configuration, a control system selectively disconnects the battery pack from the voltage bus by transmitting a voltage signal to the main pyro fuse. This occurs when the measured current value is indicative of a short-circuit fault.

The current sensing element may include an overcurrent comparator operable for detecting the short-circuit fault.

The HV component, e.g., a power inverter, includes a plurality of HV components in one or more embodiments, with the current sensing element having a plurality of current sensors. Each current sensor for its part is connected in series with a respective one of the HV components.

The control system in a possible implementation includes a Sensing and Diagnostics Module (SDM) operable for detecting the threshold force or deceleration fault of the mobile platform, and for opening the main pyro fuse via a corresponding voltage signal in response thereto.

The RESS may include a main contactor connected to the battery pack and the DC voltage bus, e.g., the negative bus rail thereof. The control system may include a Bus Disconnect Signal Board (BDSB) or other suitable electronic control unit, which is in communication with the current sensing element and operable for opening the main contactor in response to a detected overcurrent fault of the battery electric system.

The battery pack in a possible setup includes first and second battery packs that are selectively connectable, via a switching circuit, in a series-connected (S-connected) or a parallel-connected (P-connected) configuration as needed. In a non-limiting configuration, the first and second battery packs have a respective nominal voltage capability of at least 300-volts, with the P-connected configuration thus providing a nominal battery voltage of at least 300-volt and the S-connected configuration providing a nominal battery voltage of at least 600-volts.

As noted above, certain embodiments of the present disclosure use channel switches on the above-noted HV channels. Thus, a representative construction of the battery electric system in an alternative embodiment includes the DC voltage bus and the battery pack connected thereto, as well as an HV component connected to the voltage bus via a respective one of the HV channels. A current sensing element is connected to the HV component for each HV channel, either as different current sensing elements or a common/shared current sensing element. A channel switch is connected to or integral with the current sensing element (s), with the channel switch being configured to disconnect the HV component from the voltage bus. This action occurs when the channel switch is commanded to open, either by a voltage signal from a control system or by a responsive action of the channel switch itself in alternative embodiments, which in turn transpires in response to a measured current from the current sensing element being indicative of a short-circuit fault.

The current sensing element may include an overcurrent comparator operable for detecting the short-circuit fault.

As contemplated herein, the channel switch may include a channel pyro fuse similar to the main pyro fuse noted above, or the channel switch may be embodied as a solid-state relay. The current sensing element in one or more embodiments is integral with the channel switch. For instance, the current sensing element and the channel switch may be packaged together to form an electromechanical fuse assembly or "smart fuse" configured to open in response to a threshold current.

Another aspect of the disclosure includes a motor vehicle having road wheels connected to a vehicle body, and battery electric system operable for powering the road wheels. The battery electric system in accordance with a representative embodiment includes the battery pack connected to the DC voltage bus, an HV component connected to the bus via an HV channel, a current sensing element connected to the HV component on the HV channel, and a channel switch. The channel switch in this non-limiting configuration is connected to or integral with the current sensing element, and configured to disconnect the HV component from the DC voltage bus by opening in response to a measured current from the current sensing element being indicative of a short-circuit fault.

The above summary is not intended to represent every embodiment or aspect of the present disclosure. Rather, the foregoing summary exemplifies certain novel aspects and features as set forth herein. The above noted and other features and advantages of the present disclosure will be readily apparent from the following detailed description of representative embodiments and modes for carrying out the present disclosure when taken in connection with the accompanying drawings and the appended claims.

BRIEF DESCRIPTION OF THE DRAWINGS

FIG. 2A schematically depicts an embodiment of a control system for use with the battery electric system of FIG. 2 describing a control sequence for fault-based disconnection of the battery pack or HV components noted above.

Figure 1:
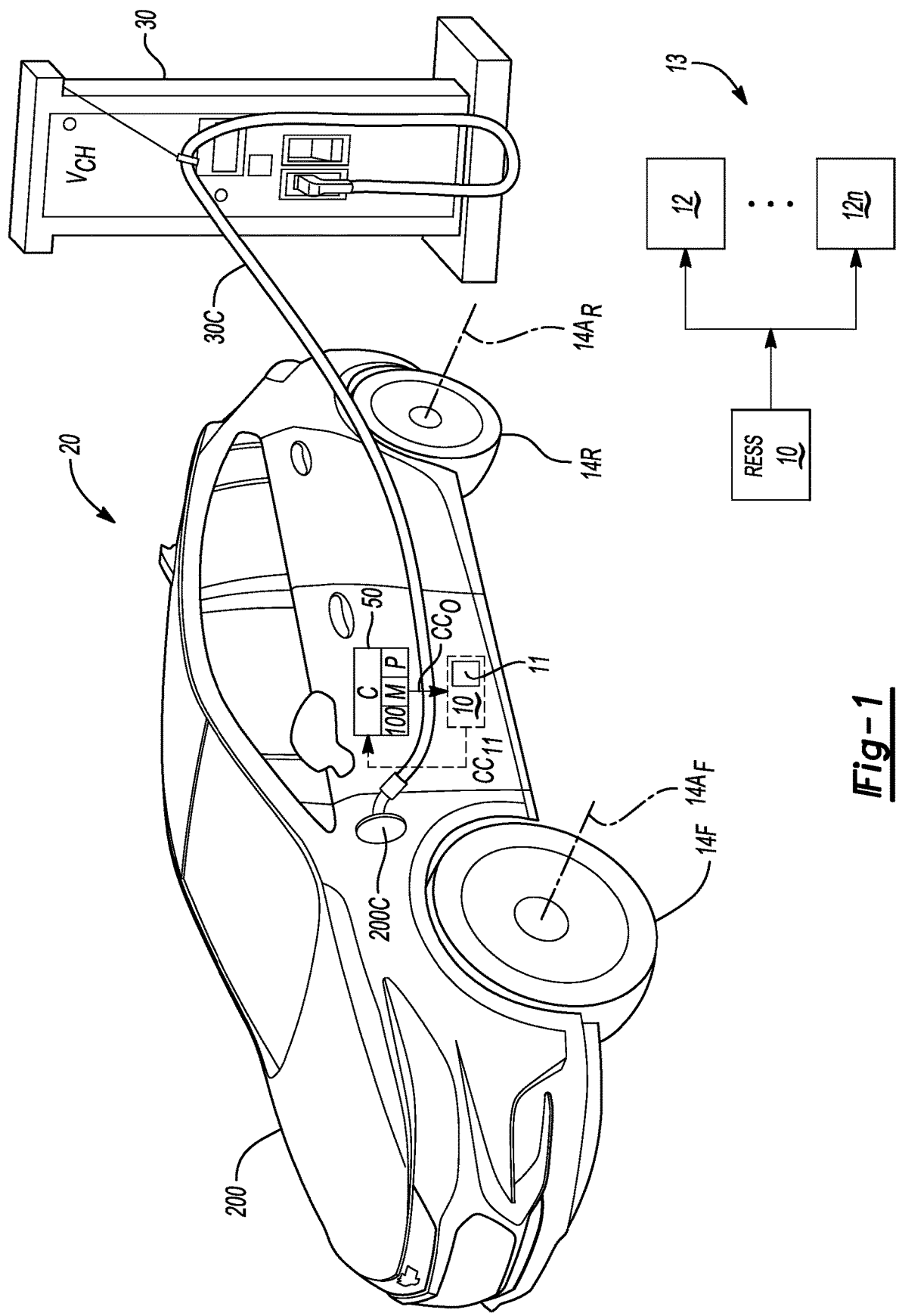
FIG. 1 is a perspective view illustration of a representative motor vehicle having a battery electric system configured in accordance with the present disclosure.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Referring to the drawings, wherein like reference numbers refer to the same or like components in the several Figures, electrical power from a discharge of a rechargeable energy storage system ("RESS") 10 is used to power a plurality (n) of high-voltage (HV) components 12 as part of a battery electric system 13, where n is an application-specific integer. Shown schematically in FIG. 1, the HV components 12, . . . , 12n may include, by way of example and not of limitation, one or more power inverters, auxiliary power modules/direct current (DC)-to-DC voltage converters, onboard charging modules, drive units, and the like. The battery electric system 13 may be used aboard a motor vehicle 20 in the illustrated exemplary embodiment of FIG. 1, with the motor vehicle 20 being variously configured as a battery electric vehicle or a plug-in hybrid electric vehicle as described herein. Other rechargeable systems may be envisioned within the scope of the present disclosure, and therefore the vehicular embodiment of FIG. 1 is just one possible implementation of the present teachings. For clarity and simplicity, the collective set of HV components 12, . . . , 12n is referred hereinafter as the HV components 12.

The present control strategy may be embodied as computer-readable instructions 100 recorded in memory (M) of a control system (C) 50, i.e., one or more digital computers or electronic control units, and executed by one or more processors (P). Thus, the method performed by execution of the instructions 100 is referred to herein as method 100 for clarity. The memory (M) includes tangible, non-transitory memory, e.g., read only memory, whether optical, magnetic, flash, or otherwise. The control system 50 also includes application-sufficient amounts of random-access memory, electrically-erasable programmable read only memory, and the like, as well as a high-speed clock, analog-to-digital and digital-to-analog circuitry, and input/output circuitry and devices, as well as appropriate signal conditioning and buffer circuitry.

The battery electric system 13 as contemplated herein includes a battery disconnect circuit 11, various embodiments of which are described in detail below with reference to FIGS. 2-7. The control system 50 in one or more embodiments is operable for receiving input signals (arrow $CC_{11}$) from the battery disconnect circuit 11 indicative of an electric current passing between the RESS 10 and the various HV components 12. Execution of the present method 100 seeks to protect the RESS 10 and the HV components 12 from thermal damage due to possible short-circuit faults, and from detection by the control system 50 of accidents or other threshold force/deceleration faults and overcurrent faults. The control system 50 executes the described control actions via output signals (arrow $CC_O$) as described below.

In the exemplary embodiment of FIG. 1, the motor vehicle 20 includes a vehicle body 200 having a charging receptacle 200C. The vehicle body 200 is connected to front road wheels 14F and rear road wheels 14R. The respective front and rear road wheels 14F and 14R rotate about a corresponding drive axis $14A_F$ and $14A_R$ when the RESS 10 discharges a stored electrical charge to one or more of the HV components 12 configured as, e.g., a power inverter for a polyphase/alternating current electric propulsion motor. In such a configuration, pulse width modulation or other switching state control is used to energize individual phase windings of the traction motor, thereby producing torque about one or both of the drive axes $14A_F$ and/or $14A_R$, as appreciated in the art. The battery electric system 13 is thus operable for powering the road wheels 14F and/or 14R in different embodiments, depending on the particular drive configuration of the motor vehicle 20.

In the charging state illustrated in FIG. 1, the RESS 10 is recharged by a charging voltage ($V_{CH}$) from an offboard charging station 30. The charging voltage ($V_{CH}$) is conducted to the RESS 10 by the offboard charging station 30 via a charging cable 30C, with the charging cable 30C terminating in an SAE J1772 charge connector (not shown) or another suitable charge connector. When the motor vehicle 20 is connected to the offboard charging station 30 in this manner, the charging voltage ($V_{CH}$) and a corresponding charging current is used to recharge constituent electrochemical battery cells 41 of the RESS 10, with such battery cells 41 shown schematically in FIG. 2.

The offboard charging station 30 of FIG. 1 may be configured as a DC fast charging station, such that the charging voltage ($V_{CH}$) is nominally 300-volts to 400-volts or more. To that end, the RESS 10 in the non-limiting exemplary embodiments shown in FIGS. 2-7 is selectively transitioned to a parallel-connected ("P-connected") or a series-connected ("S-connected") configuration to respectively accommodate a lower or higher level of the charging voltage ($V_{CH}$). The exemplary dual-pack configurations described below and shown in the various Figures may be configured to provide a nominal battery voltage of 300-volts to 400-volts in a possible embodiment, when in the S-connected configuration, and 600-volts to 800-volts in the P-connected configuration. Various embodiments of the battery electric system 13 will now be described in further detail with respect to the remaining Figures.

Figure 2:
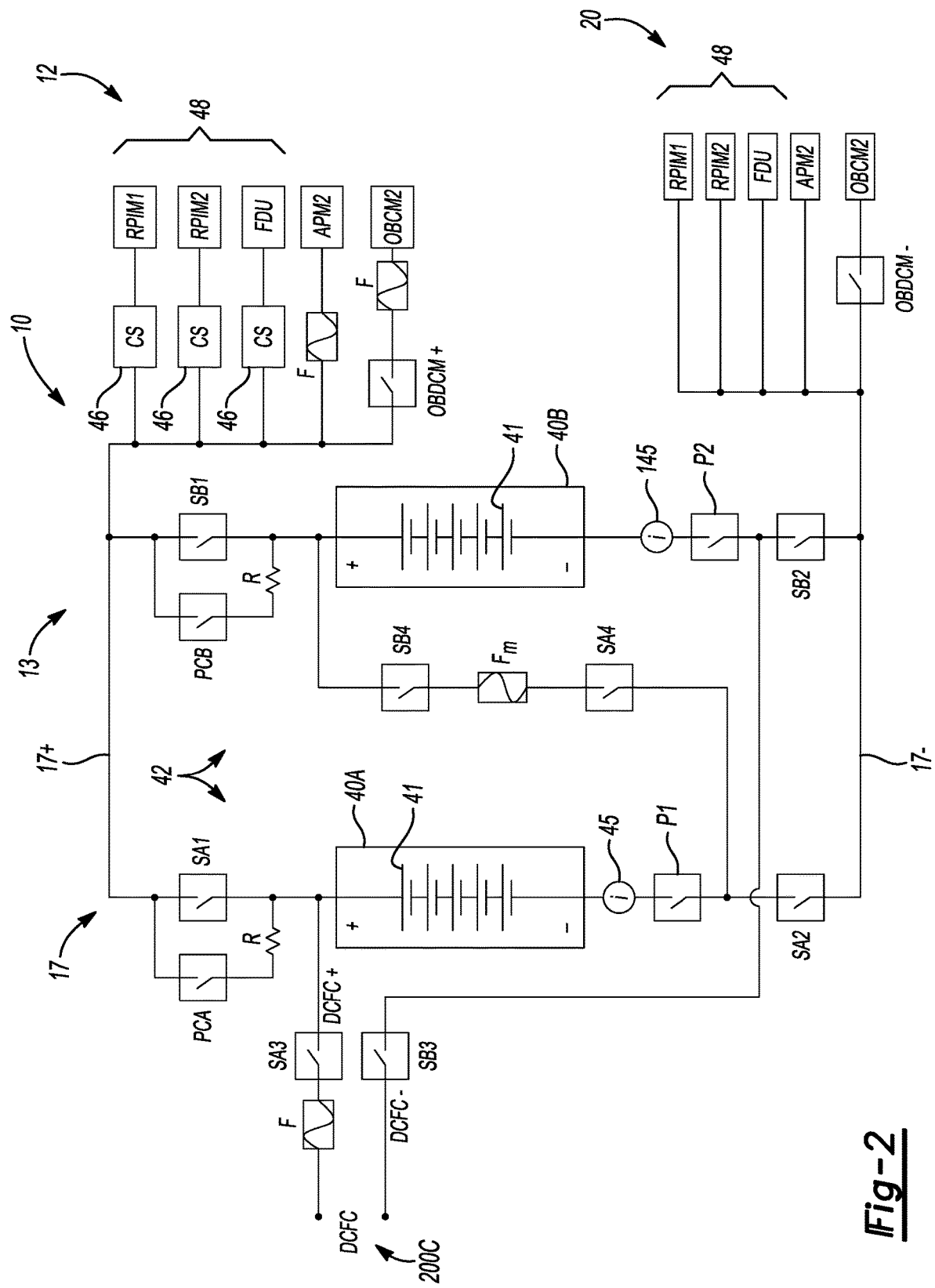
FIG. 2 is a schematic circuit diagram of the battery electric system having a battery pack in which individual current sensing elements are connected in series with a corresponding number of high-voltage (HV) components.

Referring to FIG. 2, the RESS 10 in a non-limiting exemplary configuration includes battery modules 40A and 40B, each having positive (+) and negative (−) battery terminals. The constituent battery cells 41 of the battery modules 40A and 40B may be constructed of a lithium-ion, zinc-air, nickel-metal hydride, or another application-suitable high-energy battery chemistry. The RESS 10 is selectively reconfigured by operation of the control system 50 of FIG. 1 to supply a battery voltage across positive and negative bus rails $17^+$ and $17^−$ of a DC voltage bus 17. A battery switching circuit 42 is configured to establish the above-summarized P-connected or S-connected configurations. Additionally, the RESS 10 includes two main pyrotechnic fuses P1 and P2 ("main pyro fuses"), which irreversibly fail in an open position in response to a corresponding voltage signal $CC_A^*$ or $CC_B^*$ (see FIG. 2A) to rapidly disconnect the respective battery packs 40A and 40B in response to a fault as set forth below.

Baseline P-connected/S-connected switching control may be performed using the illustrated battery switching circuit 42 apart from the structure and function of the battery disconnect circuit 11 of the present disclosure. In general, the RESS 10 of FIG. 2 is connected to the offboard charging station 30 of FIG. 1, for an exemplary DC fast-charge (DCFC) session, via the charging receptacle 200C. The charging receptacle 200C is connected via an intervening fuse (F) and contactors SA3 and SB3, with a positive voltage (DCFC$^+$) and a negative voltage (DCFC$^−$) from the offboard charging station 30 of FIG. 1 provided to the corresponding contactors SA3 and SB3. The positive battery terminal of battery pack 40A is connected to the positive bus rail $17^+$ by contactors PCA and SA1, with contactor PCA being a pre-charge contactor, and a resistor R being a pre-charge resistor. In a similar manner, the battery pack 40B is connected to the positive bus rail $17^+$ by contactors PCB and SB1 and another pre-charge resistor R. Series contactors SA4 and SB4 with a mid-pack fuse $F_m$ arranged therebetween are positioned between the negative battery terminal of battery pack 40A and the positive battery terminal of battery pack 40B.

Analogous to what are referred to herein as the positive contactors SA1 and SB1 at the positive bus rail $17^+$, the RESS 10 also includes main negative contactors SA2 and SB2 between the respective negative battery terminals of the battery packs 40A and 40B and the negative bus rail $17^−$. Thus, the battery packs 40A and 40B may be disconnected by operation of the control system 50 of FIG. 1 by opening the main negative contactors SA2 and SB2 in a possible implementation. In the circuit topologies of FIGS. 2-7, this occurs in response to a detected overcurrent fault. The battery switching circuit 42 also includes an integrated current sensor (SC) 45 and 145, also labeled "i" in the various Figures, arranged between the negative battery terminals of battery packs 40A and 40B and the main pyro fuses P1 and P2 as shown, with the current sensors 45 and 145 measuring and reporting respective pack currents to or from the battery packs 40A and 40B during operation of the RESS 10.

CIRCUIT-BASED RESS DISCONNECT STRATEGY: referring briefly to FIG. 2A, the control system 50 of FIG. 1 may be embodied as multiple sub-controllers or electronic control units each having a dedicated set of disconnect functions within the scope of the present disclosure: a Sensing and Diagnostics Module (SDM) 50A, a Bus Disconnect Signal Board (BDSB) 50B, and a Vehicle Integration Control Module (VICM) 50C. As appreciated in the art, the SDM 50A is configured to detect threshold forces/decelerations indicative of a traffic accident. In response to a threshold force/deceleration fault detected by the SDM 50A, e.g., using accelerometers or force sensors, the SDM 50A outputs the small voltage signal $CC_A$ or $CC_A^*$, with voltage signal $CC_A^*$ being directed to the main pyros P1 and P2 and voltage signal $CC_A$ being directed to the BDSB 50B in different embodiments. Receipt of the voltage signal $CC_A^*$ by the main pyro fuses P1 and P2 ultimately causes the pyros to immediately open via a thermodynamic pyrotechnic response, thereby creating a sudden and irreversible disconnection of the battery packs 40A and 40B from the DC voltage bus 17.

The BDSB 50B for its part is embodied as an electronic circuit board configured to control the open/closed states of the various contactors shown in FIGS. 2-7, i.e., PCA, PCB, SA1, SB1, SA2, SB2, SA4, and SB4. The current sensing elements (CS) 46 as described in detail below for their part provide the input signals (arrow $CC_{11}$) to the BDSB 50B in various embodiments as part of a designated short-circuit fault-based disconnect function. The VICM 50C is yet another embedded controller of the motor vehicle 20 shown in FIG. 1, programmed to perform the particular functions noted herein as well as possibly others in the overall operation of the control system 50. The VICM 50C thus outputs a control signal (arrow $CC_C$) to the BDSB 50B in response to a detected overcurrent fault as part of its programmed overcurrent protection function.

The various circuit topologies of FIGS. 2-7 incorporate circuit-triggered control of the main pyro fuses P1 and P2 and the battery disconnect circuit 11 to protect the RESS 10 under three different conditions: (1) a short-circuit fault, (2) a force/deceleration-based fault, and (3) an overcurrent fault. For overcurrent fault protection, the representative embodiments of FIGS. 2-7 may rely on the VICM 50C of FIG. 2A informing the BDSB 50B of such a condition, via the control signal $CC_C$ of FIG. 2A, with the BDSB 50B thereafter responding by opening the main negative contactors SA1 and SB2 to disconnect the battery packs 40A and 40B from the DC voltage bus 16, in this exemplary instance from its negative bus rail $17^-$. The other two fault handling strategies contemplated herein, i.e., short-circuit and force/deceleration-based disconnection of the RESS 10, the present approach uses various hardware and electronic signals to affect the desired disconnections.

In the representative topology of FIG. 2, for example, the SDM 50A of FIG. 2A responds to a detected threshold force/deceleration indicative of a traffic accident by transmitting the voltage signal $CC_A$ to the BDSB 50B, which in turn triggers the main pyro fuses P1 and P2, thus causing the main pyro fuses P1 and P2 to irreversibly open. In an exemplary implementation, an LTC2949 chip, commercially available from Analog Devices, Inc. of Wilmington, NC, measures current on a 400 kHz heartbeat signal using an overcurrent comparator 47, with the overcurrent comparator 47 depicted schematically in FIG. 2A. Using this input, which should arrive within about 70 ms, the BDSB 50B is able to send the voltage signal $CC_B^*$ to the main pyro fuses P1 and P2, thereby triggering the main pyro fuses P1 and P2 in less than 90 ms. Given the present limited commercial availability of a dual-input pyro fuse, the voltage signal (arrow $CC_A$) from the SDM 50A is routed through the BDSB 50B in this particular embodiment.

Short-circuit fault handling in the representative FIG. 2 embodiment is achieved using current sensing elements 46, a corresponding one of which is arranged in series with certain HV components 12 of FIG. 1. The particular circuit channels on which such HV components 12 are disposed are referred to herein as HV channels 48. In particular, a respective current sensing element 46, itself possibly including the above-noted overcurrent comparator 47 of FIG. 2A operable for detecting an overcurrent fault, is arranged between the positive voltage rail $17^+$ and rear power inverter module (RPIM1), a rear power inverter module (RPIM2), and a front drive unit (FDU). "Rear" and "front" nomenclature in the examples of FIGS. 2-7 is merely exemplary, with the particular location and use aboard the motor vehicle 20 of FIG. 1 varying with the application.

Also shown in FIG. 2 are on-board diagnostic control module ($OBDCM^+$, $OBDCM^-$) contactors respectively connected to the positive rail $17^+$ and negative rail $17^-$, with a thermal fuse F disposed between the $OBDCM^+$ and an onboard charging module (OBCM2), and a similar thermal fuse F disposed between the positive rail $17^+$ and an auxiliary power module (APM2). Thus, the HV channels 48 of interest in this embodiment are the power inverters used for powering corresponding electric propulsion motors (not shown) for propelling the motor vehicle 20 of FIG. 1.

Figure 3:
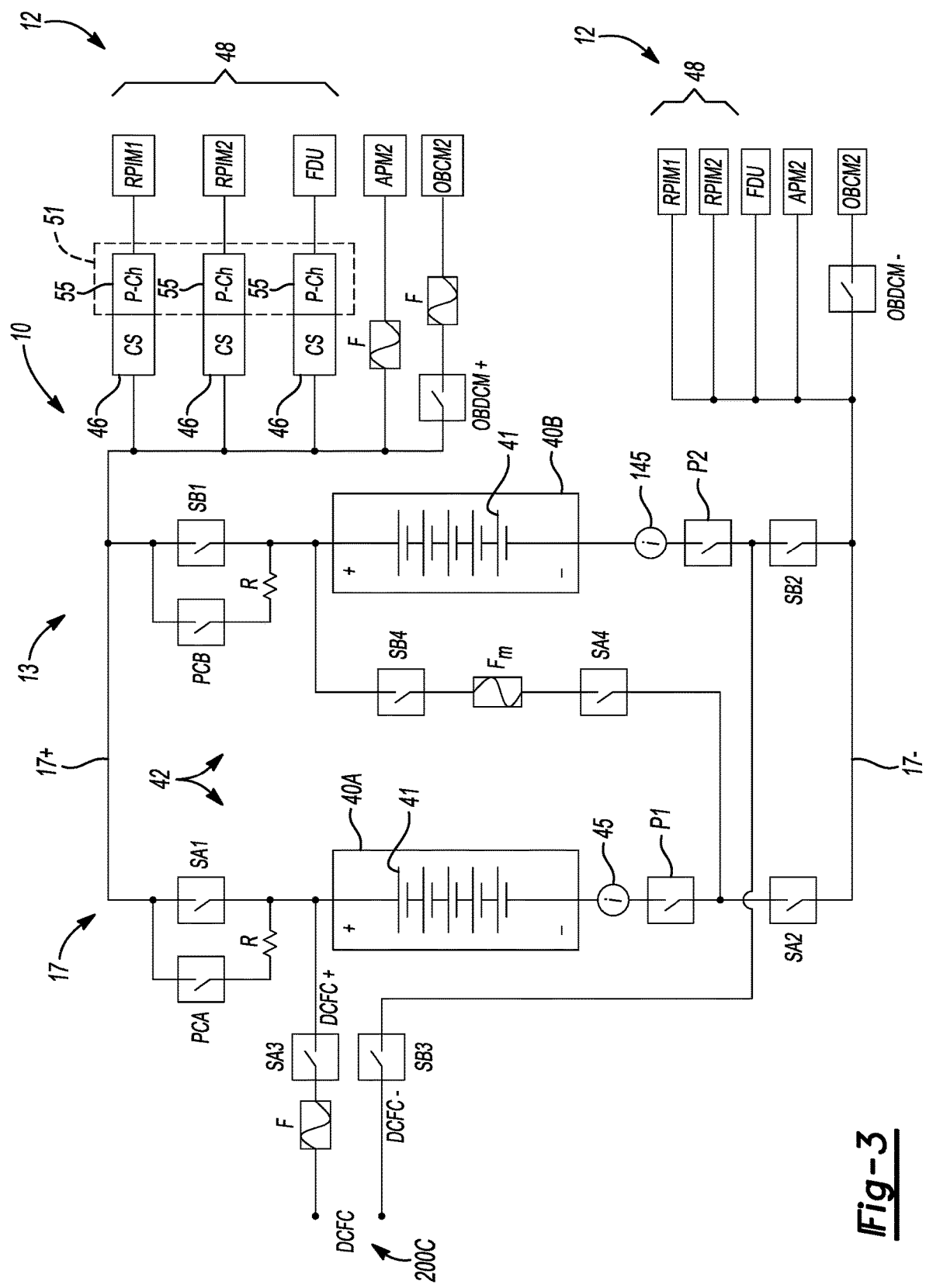
FIG. 3 is a schematic circuit diagram describing an alternative embodiment in which the current sensing elements of FIG. 2 directly control a respective channel switch.

FIG. 3 illustrates an alternative embodiment in which the current sensing elements 46 of FIG. 2 are placed in series with a respective channel switch 51. In various embodiments, the channel switch 51 is connected to or integral with the current sensing elements 46, and configured to disconnect the HV component(s) 12 from the DC voltage bus 17 by opening in response to a measured current value from the current sensing element(s) 46 being indicative of a short-circuit fault.

The channel switches 51 are embodied in FIG. 3 as channel pyro fuses ("P-Ch") 55 arranged on each HV channel 48, in this instance for each HV inverter, i.e., the above-noted exemplary RPIM1, RPIM2, and FDU. Short-circuit fault-based disconnection of the RESS 10 occurs in response to a measured current value by the current sensing devices 46, which causes the BDSB 50B of FIG. 2A to trigger the channel switches 51 for the respective inverters, in lieu of the FIG. 2 approach in which the BDSB 50B triggers the main pyro fuses P1 and P2. Force/deceleration faults are treated differently, with the SDM 50A of FIG. 2A directly triggering the main pyro fuses P1 and P2, unlike the FIG. 2 embodiment in which the SDM 50A works through signals communication with the intervening BDSB 50B.

Figure 4:
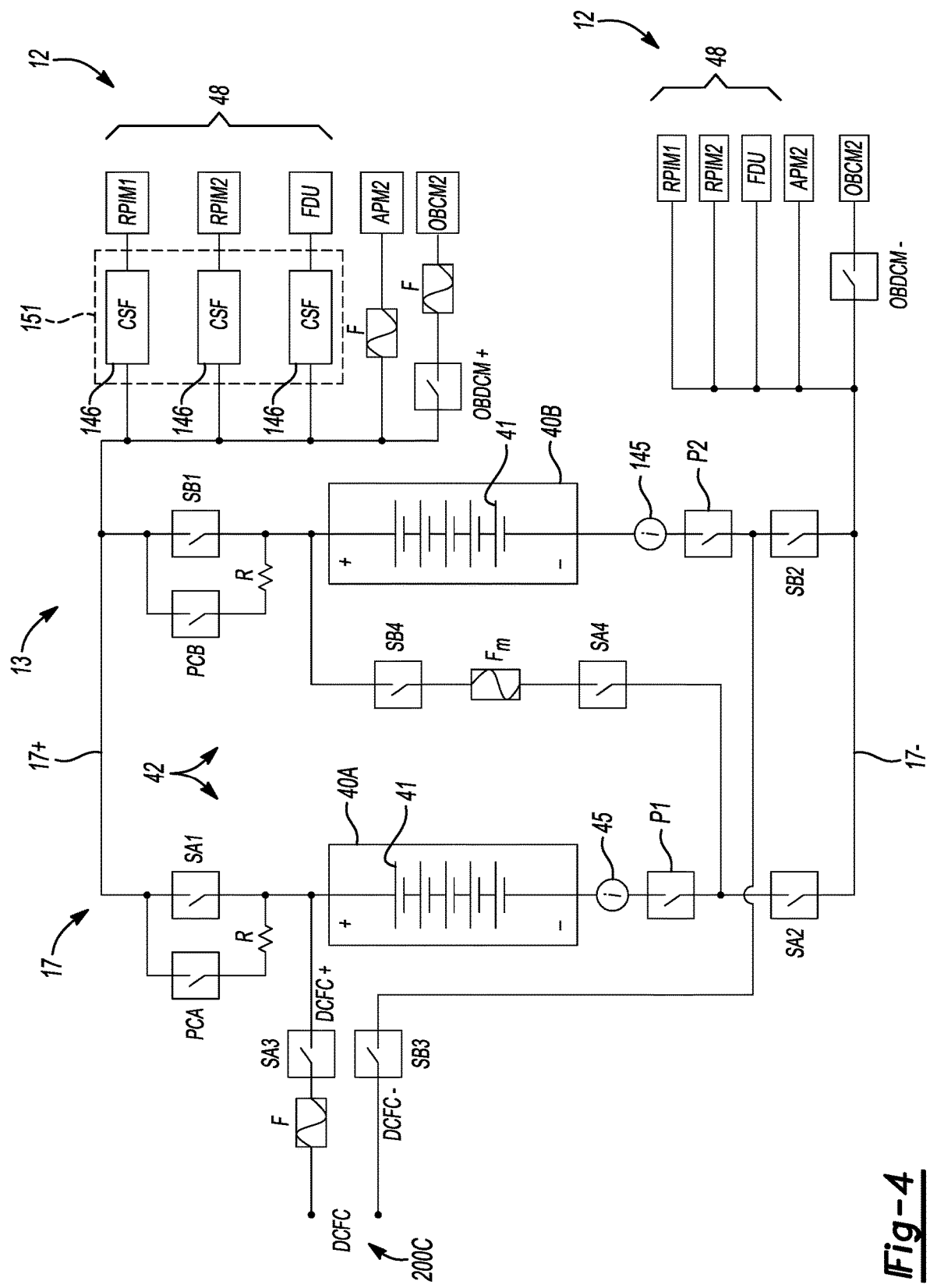
FIG. 4 is a schematic circuit diagram describing another alternative embodiment in which current sensing elements of FIG. 3 are replaced with integrated smart fuses.

Referring now to FIG. 4, the circuit topology of FIG. 3 may be further modified by replacing the current sensing devices 46 and the channel pyro fuses 55 with channel switches 151 in the form of hermetically sealed, electromechanical current-sensing "smart" fuses (CSF) 146. An exemplary solution for implementing the smart fuses 146 is the commercially available GigaFuse™ from Sensata Technologies of Carpinteria, CA. Such electromechanical fuse assemblies may be configured to open in response to a threshold current, and have an advantage in being largely immune to thermal aging. During force/deceleration-based faults, short-circuit triggering of such smart fuses 146 has the effect of quickly and directly disconnecting the corresponding HV components 12 from the RESS 10, thus simplifying the control sequencing relative to embodiments requiring involvement of the SDM 50A and/or BDSB 50B.

Figure 5:
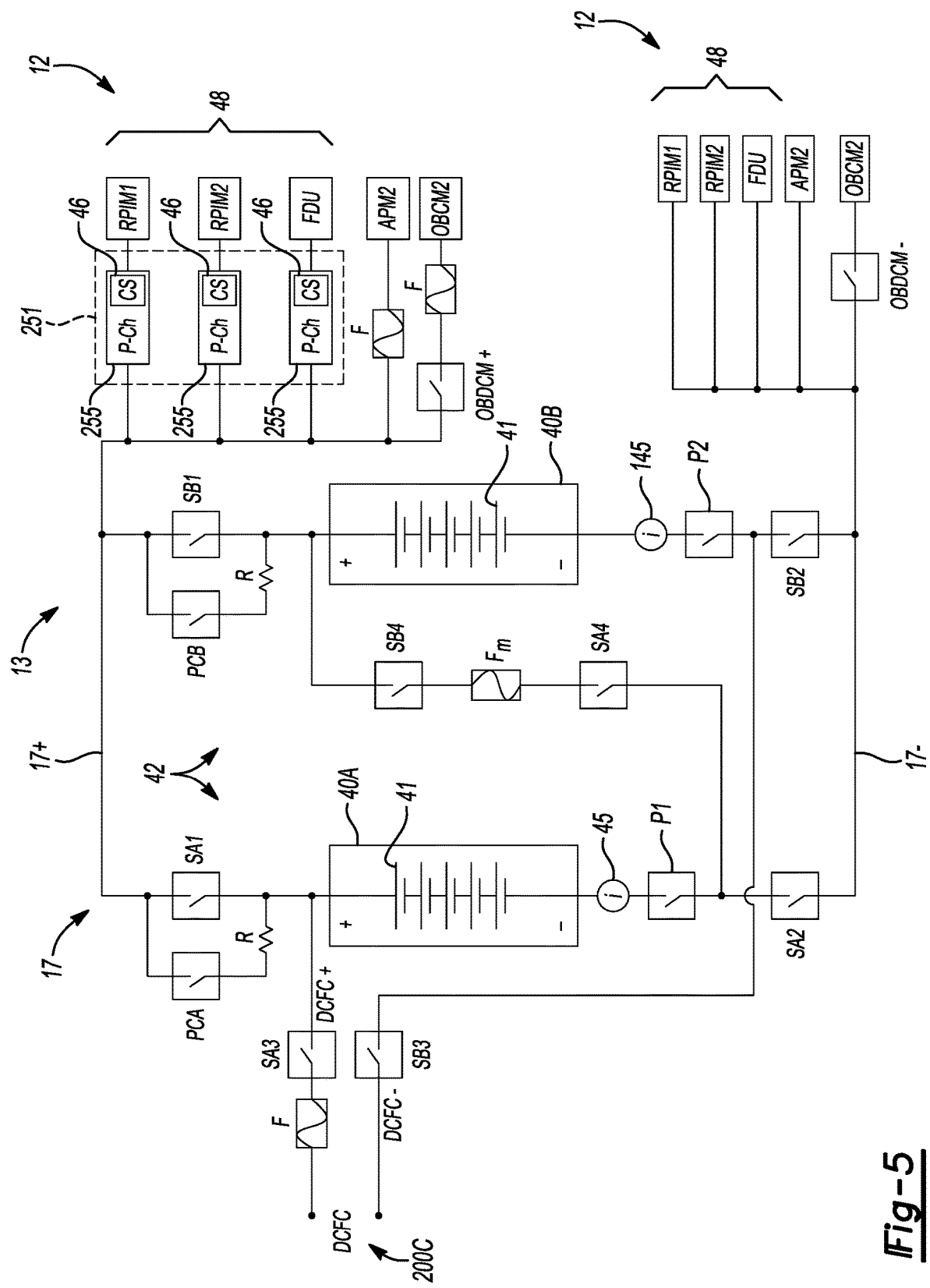
FIG. 5 is a schematic circuit diagram describing yet another alternative embodiment in which the current sensing elements are integrated with channel pyro fuses of the type shown in FIG. 3.

The present teachings may be implemented in still other ways. FIG. 5 depicts an embodiment in which channel switches 251 replace the current sensing elements 46 and channel pyro fuses 55 of FIG. 3. This construction integrates channel pyro fuses 255 and current sensors 46 for use with each HV inverter, e.g., the representative RPIM1, RPIM2, and FDU. The current sensors 46 in this embodiment may include corresponding control boards (not shown) integrated into or connected to a corresponding channel pyro fuse 255, such that the channel pyro fuses 255 in this particular embodiment are directly triggered without involvement of the BDSB 50B of FIG. 2A. The SDM 50A of FIG. 2A would still function as noted above, i.e., with the SDM 50A triggering the main pyro fuses P1 and P2 in response to detection of a threshold force/deceleration fault.

Figure 6:
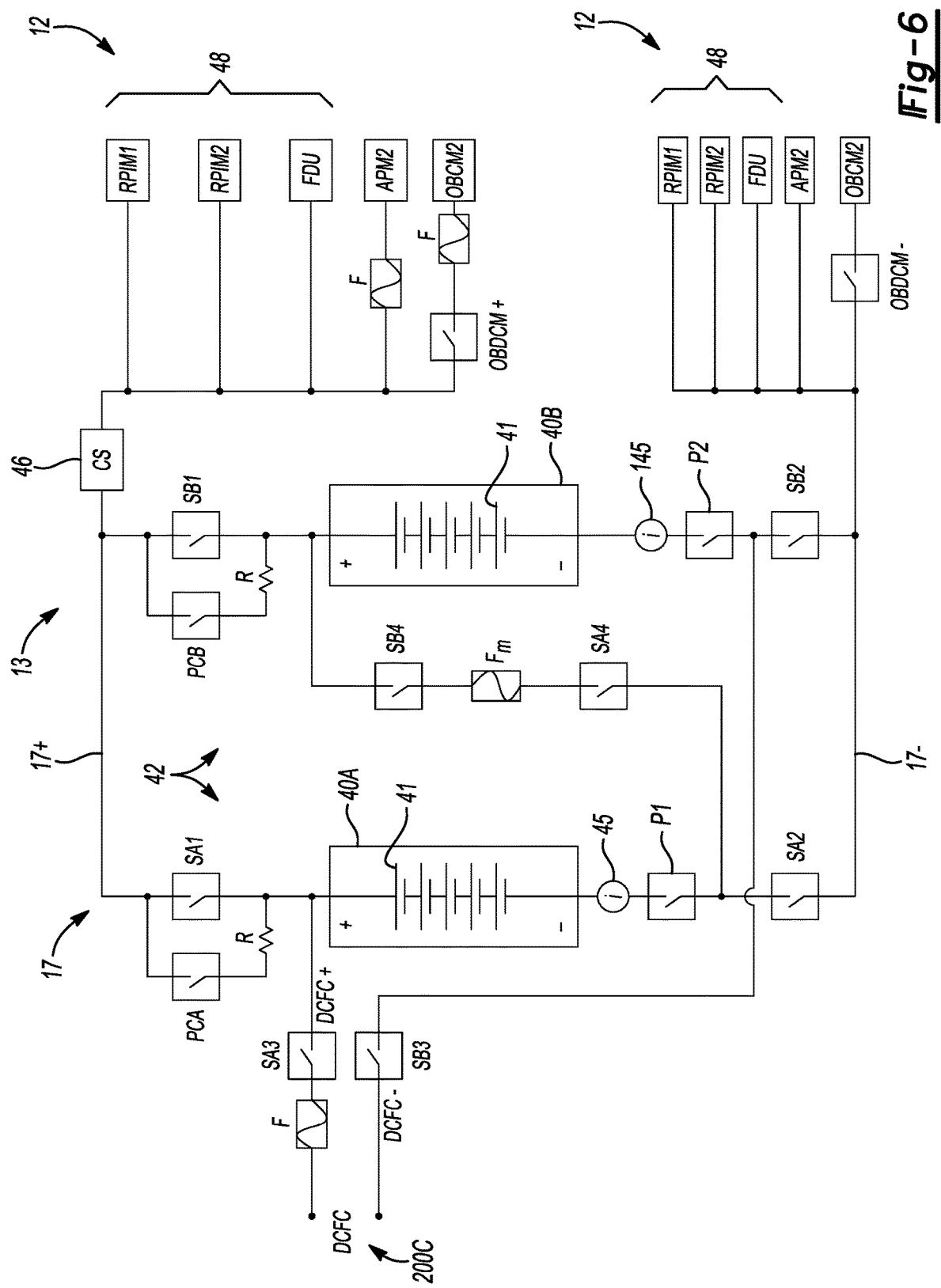
FIG. 6 is a schematic circuit diagram describing yet another alternative embodiment in which the current sensing elements of FIG. 2 are replaced with a unitary current sensor, which in turn performs a current measurement for a plurality of HV components.

FIG. 6 depicts yet another embodiment in which a single current sensing element 46 is used to protect the HV components 12 on the various HV channels 48, as opposed to using a different current sensing element 46 on each respective one of the HV channels 48 as shown in FIGS. 2-5. As with the earlier discussed embodiments, overcurrent fault protection is provided by the BDSB 50B and the VICM 50C of FIG. 2A, with short-circuit fault protection provided by the SDM 50A, the BDSB 50B, and the main pyro fuses P1 and P2.

Figure 7:
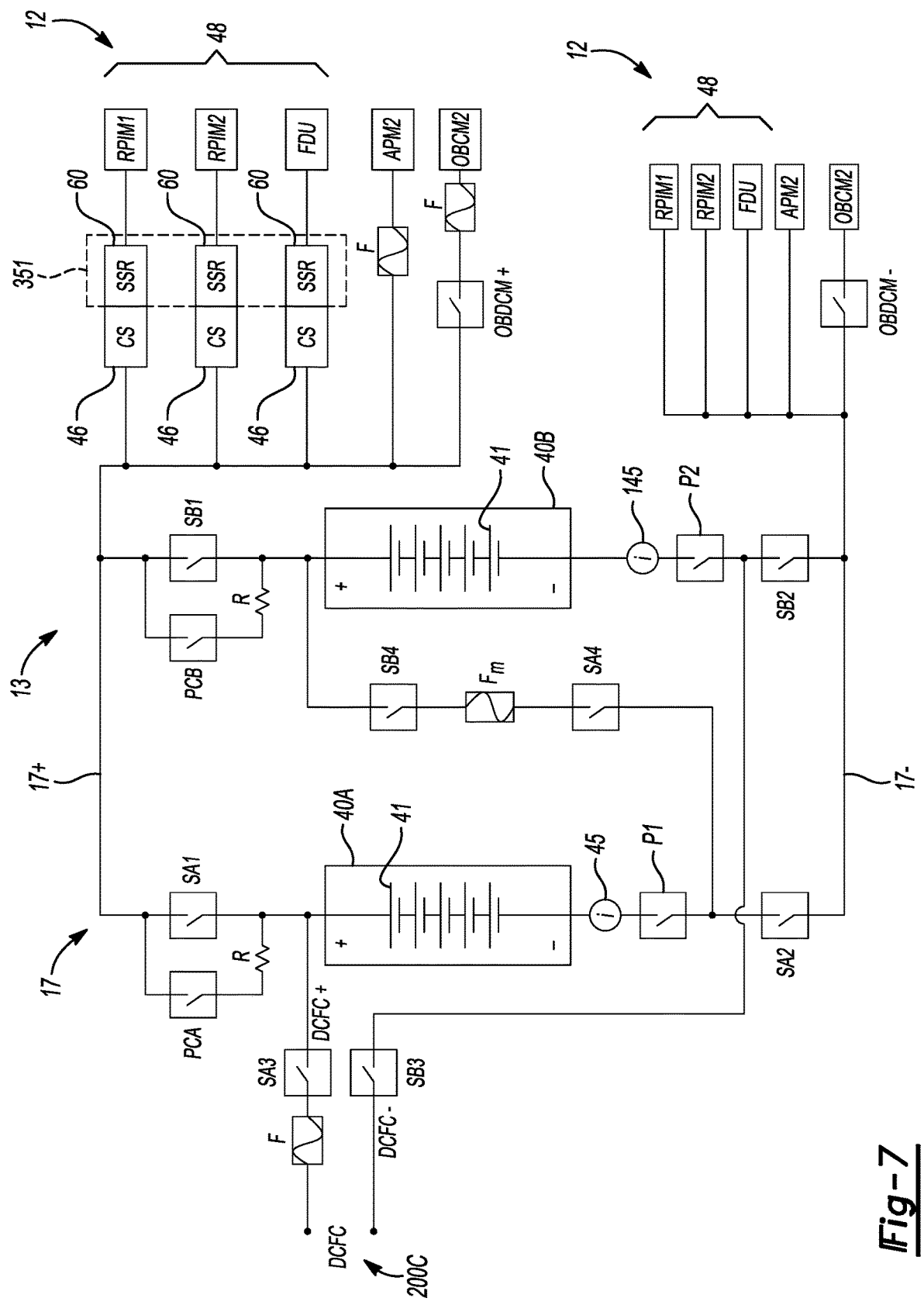
FIG. 7 is a schematic circuit diagram describing an embodiment in which the current sensing elements are connected to respective solid-state relays (SSRs).

Referring now to FIG. 7, this approach modifies the circuit topology of FIG. 3 by introducing a channel switch 351 in which the pyro fuses 55 described above are replaced with solid-state relays (SSRs) 60. Each HV channel 48 has a corresponding SSR 60 positioned in series with a current sensor 46 in this embodiment. As appreciated in the art, an SSR differs from an electromagnetic relay or a contactor in its absence of moving parts, with an accompanying absence of surge and noise during operation.

In this exemplary configuration, a force/deceleration fault triggers activation of the main pyro fuses P1 and P2 through control intervention of the SDM 50A of FIG. 2A, with overcurrent fault protection provided in the same manner as the prior described embodiments, i.e., via communication of the VICM 50C and BDSB 50B, with the latter ultimately commanding the main negative contactors SA2 and SB2 to open. Additionally, short-circuit fault-based disconnection is provided by operation of the current sensing elements 46, which transmit respective input signals (arrow $CC_{11}$) to the BDSB 50B. The BDSB 50B in turn commands the SSRs 60 to open, thereby mitigating the short-circuit fault condition on one or more of the various HV channels 48.

The above described hardware of FIGS. 1-7 enable the method 100 to be used with the battery electric system 13. A general embodiment of such a method 100 includes measuring a current value on the HV channel(s) 48 via the current sensing element(s) 46 in the various configurations set forth herein. The method 100 also includes opening the main pyro fuses P1 and P2, or the various channel switches 51, 151, 251, or 251, when the measured current value is indicative of a short-circuit fault of the battery electric system 13.

The foregoing disclosure in its various implementations provides an apparatus and corresponding methodology to protect the RESS 10 and connected HV components 12, especially the inverter equipment disposed on the various HV channels 58 discussed above. The solutions improve upon the general art of arranging thermal fuses in the various HV channels 48 of the circuitry of the RESS 10, e.g., when powering battery electric vehicle drive units. Such thermal fuses tend to suffer from thermal fatigue, which in turn increases prevalence of maintenance issues and causes premature aging of the RESS 10. The present solutions address this and other potential problems by providing an innovative circuit-based protection strategy using a combination of sensors, circuit interruption devices, and control operations, with various implementations also reducing mass and volume relative to the current state of the art. These and other attendant benefits will be readily appreciated by those of ordinary skill in the art in view of the foregoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A battery electric system comprising:
    a direct current (DC) voltage bus having a positive bus rail and a negative bus rail;
    a battery pack connected to the DC voltage bus, and having a positive battery terminal and a negative battery terminal;
    a main pyrotechnic fuse ("pyro fuse") connected to the negative bus rail of the battery pack and the DC voltage bus;
    a plurality of high-voltage (HV) components each connected to the DC voltage bus via a respective HV channel;
    a plurality of current sensing elements each connected to a corresponding one of the HV components on the respective HV channel, and configured to output a measured current value;
    a plurality of channel switches each integrated or connected in series with a respective one of the plurality of current sensing elements; and
    a control system configured to selectively disconnect the battery pack from the DC voltage bus by transmitting a voltage signal to the main pyro fuse to disconnect the battery pack from the DC voltage bus in response to a force or deceleration fault, and to one or more of the plurality of channel switches to disconnect one of more of the plurality of HV components when the measured current value is indicative of a short-circuit fault.

2. The battery electric system of claim 1, wherein each respective one of the plurality of current sensing elements includes an overcurrent comparator operable for detecting the short-circuit fault.

3. The battery electric system of claim 1, wherein at least one of the plurality of HV components includes a power inverter.

4. The battery electric system of claim 1, wherein the control system includes a sensing and diagnostics module (SDM) operable for detecting a threshold force or deceleration indicative of the threshold force or deceleration fault, and further operable for opening the main pyro fuse by transmitting a corresponding voltage signal to the main pyro fuse in response to detecting the threshold force or deceleration fault.

5. The battery electric system of claim 1, further comprising a main contactor connected in series with the main pyro fuse, wherein the control system includes:
    a Bus Disconnect Signal Board (BDSB) in communication with the plurality of current sensing elements and operable for opening the main contactor in response to a control signal; and
    a Vehicle Integrated Control Module (VICM) configured to output the control signal to the BDSB in response to the overcurrent fault.

6. The battery electric system of claim 1, wherein the battery pack includes a first battery pack and a second battery pack that are selectively connectable, via a switching circuit, in a series-connected (S-connected) or a parallel-connected (P-connected) configuration.

7. The battery electric system of claim 6, wherein the first battery pack and the second battery pack have a respective nominal voltage capability of at least 300V.

8. A battery electric system comprising: a direct current (DC) voltage bus; a battery pack connected to the DC voltage bus; a plurality of high-voltage (HV) components each connected to the DC voltage bus via a respective HV channel, such that the battery electric system includes a plurality of HV channels;
a plurality of current sensing elements each connected to a corresponding one of the HV components on the respective HV channel, and configured to output a measured current value indicative of a short-circuit fault; and a plurality of channel switches each connected in series with or integral with a respective one of the current sensing elements, and configured to disconnect a respective one of the HV components from the DC voltage bus in response to the measured current value.

9. The battery electric system of claim 8, wherein each respective one of the plurality of current sensing element includes an overcurrent comparator operable for detecting the short-circuit fault.

10. The battery electric system of claim 8, further comprising a control system, wherein the plurality of channel switches are configured to open in response to a voltage signal from the control system.

11. The battery electric system of claim 8, wherein each respective one of the plurality of channel switches include a channel pyro fuse.

12. The battery electric system of claim 8, wherein the plurality of channel switches include a solid-state relay.

13. The battery electric system of claim 8, wherein each respective one of the plurality of current sensing elements is integral with a respective one of the plurality of channel switches.

14. The battery electric system of claim 13, wherein the respective current sensing elements and the respective channel switches that are integral together form an electromechanical fuse assembly configured to open in response to a threshold current.

15. A motor vehicle comprising: a vehicle body; road wheels connected to the vehicle body; and a battery electric system operable for powering the road wheels, the battery electric system comprising:
a direct current (DC) voltage bus; a battery pack connected to the DC voltage bus; a main pyrotechnic fuse ("pyro fuse") connected to the battery pack and the DC voltage bus, and configured to disconnect the battery pack from the DC voltage bus in response to a force or deceleration fault;
a plurality of high-voltage (HV) components connected to the DC voltage bus via a corresponding HV channel, such that the battery electric system includes a plurality of HV channels;
a plurality of current sensing elements each connected to a corresponding one of the HV components on the corresponding HV channel, and configured to output a measured current value indicative of a short-circuit fault; and a plurality of channel switches each connected to or integral with a corresponding one of the current sensing elements, and configured to disconnect a corresponding one of the HV components from the DC voltage bus in response to the measured current value from one or more of the current sensing elements.

16. The motor vehicle of claim 15, wherein each respective one of the current sensing elements includes an overcurrent comparator operable for detecting the short-circuit fault.

17. The motor vehicle of claim 15, further comprising a control system in communication with the channel switches, wherein the control system is configured to generate a voltage signal in response to the measured current value, and wherein the channel switches are configured to open in response to the voltage signal from the control system.

18. The motor vehicle of claim 15, wherein the channel switches includes a channel pyro fuse or a solid-state relay.

19. The motor vehicle of claim 15, wherein each respective one of the current sensing elements and a corresponding one of the channel switches together form an electromechanical fuse assembly configured to open in response to a threshold current.

20. The motor vehicle of claim 17, wherein the control system is configured to detect threshold forces/decelerations indicative of a force or deceleration fault, and to transmit the voltage signal to the main pyro fuse in response to the force or deceleration fault to thereby disconnect the battery pack from the HV voltage bus.

* * * * *